UNITED STATES PATENT OFFICE.

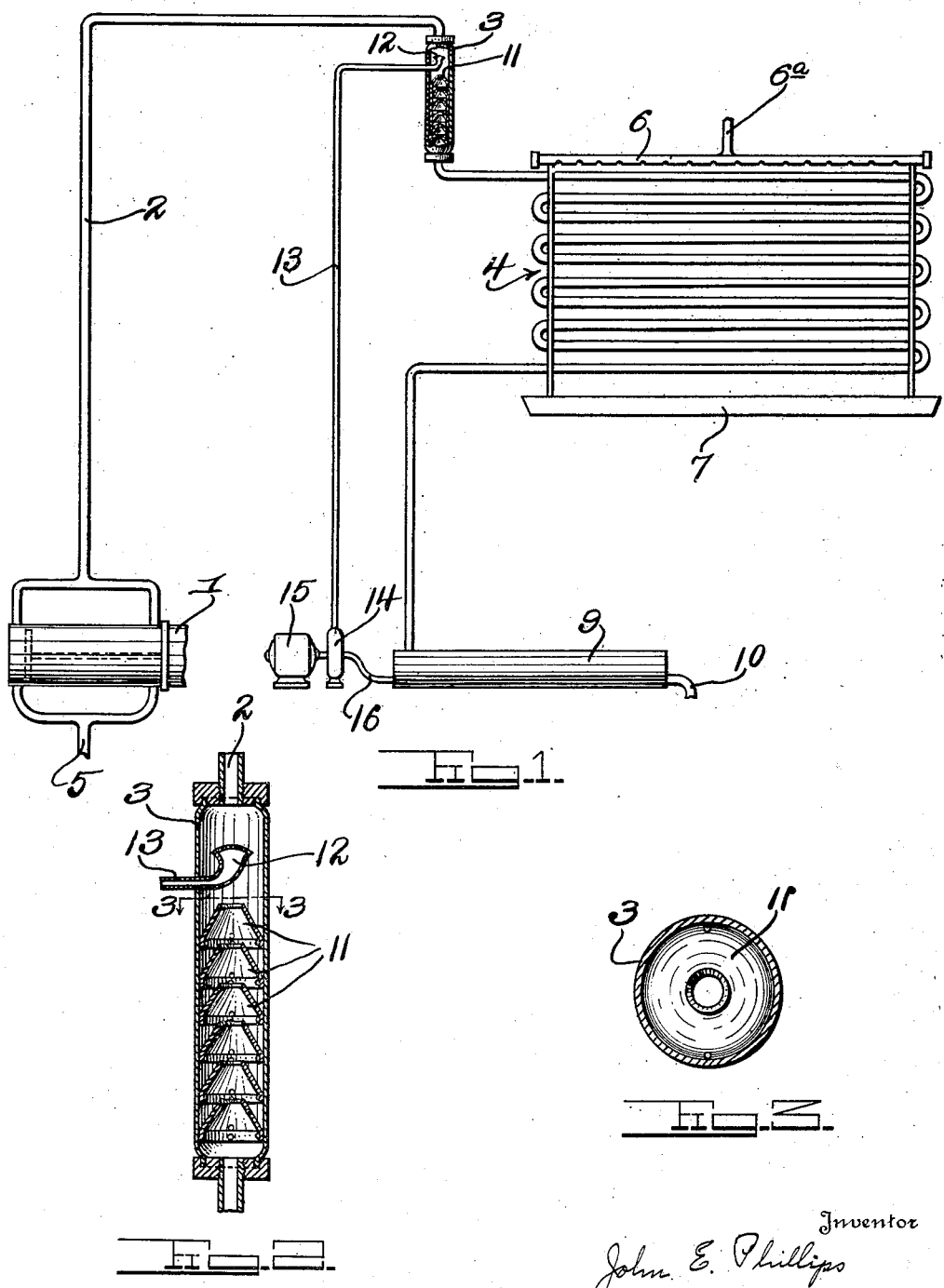

JOHN ERNST PHILLIPS, OF SHERMAN, TEXAS.

VAPOR-CONDENSING APPARATUS.

1,246,154.

Specification of Letters Patent. Patented Nov. 13, 1917.

Application filed June 6, 1916. Serial No. 102,027.

*To all whom it may concern:*

Be it known that I, JOHN E. PHILLIPS, a citizen of the United States, residing at Sherman, in the county of Grayson and State of Texas, have invented certain new and useful Improvements in Vapor-Condensing Apparatus, of which the following is a specification.

This invention relates to condensers for gas and vapor in which the action of external cooling means is aided by the application of liquid to the vapor or gas and the mixture of such liquid therewith. Heretofore such liquid has sometimes been supplied to the interior of the pipes of the condenser coils, the normal pressure of the vapor being applied to that end. It is much more efficacious, however, to employ a distinct preliminary mixing or cooling chamber or receptacle and to force the liquid into the same by supplemental independent forcing means, for example, by a pump, and to arrange the vapor inlet so that the vapor will experience the fullest and most immediate effect of the liquid injection on entering the mixing chamber. This invention consists principally in the combination of such a preliminary mixing or cooling chamber with a condenser supplied thereby, means for supplying condensable vapor or gas to said chamber and means for admitting cooling liquid to the interior of said chamber; also in the combination of means for forcing the cooling liquid into the chamber thus supplied with vapor and supplying the condenser; also in certain details of construction of said chamber or receptacle and coöperating parts hereinafter more particularly set forth and claimed.

This invention finds one of its most important applications in ice machines and other refrigerating plants which alternately use the expansion of liquid ammonia or some equivalent easily vaporizable liquid to reduce the temperature of neighboring air, water or divers articles and restore the vapor thus produced to liquid again by some cooling treatment, with incidental compression, for use over again in refrigeration by vaporization. But the said invention of course may be used with condensers irrespective of any refrigerating system or circuit and for condensing any kind of vapor or gas susceptible of such treatment.

In the accompanying drawings:

Figure 1 represents diagrammatically part of a refrigerating system embodying my invention, the mixing chamber being shown in vertical section. This view omits the refrigerating coils and any other elements which may be interposed between the storage tank or liquid receptacle and the compressor, as irrelevant to the present invention.

Fig. 2 represents an enlarged vertical sectional view of the mixing chamber and proximate parts;

Fig. 3, a transverse section on line 3—3 of Fig. 2.

The vapor compressor 1, of ordinary construction, receives, through pipe 5, the ammonia vapor from the refrigerating coils, not shown, and discharges such vapor, compressed, through the pipe 2 into the upper end of a vertical elongated mixing chamber or receptacle 3, where it is to undergo a preliminary partial condensation by mixing with liquid before passing to the condenser 4, which may be of any convenient kind, but, as shown for example, consists of an ordinary stand of coils of pipe supported by a frame which also sustains a perforated water pipe 6 above said coils, supplied by a pipe 6ª and arranged to discharge on the said coils for cooling them, this frame and condenser resting in a water-pan 7. From said condenser the ammonia in liquid form passes through pipe 8 to the storage tank or liquid receiver 9, whence it again passes by outlet pipe 10, broken away in the drawings, to said refrigerating coils, not shown, directly or indirectly as found convenient. Of course when used for other purposes than refrigeration the outlet pipe 10 will direct or distribute it accordingly.

The receptacle or mixing chamber 3 is upright in position, elongated in form, of greater diameter than the condenser pipe and the other pipes of the apparatus and provided with a series of internal annular upwardly inclined conoidal baffle plates 11, in contact with the inner face of the wall of said chamber and supported thereby, each of which baffle plates surrounds the central space of said chamber or receptacle, down which space the vapor passes, the said baffle plates acting to retard its flow and the descent of the liquid and cause eddies in them, prolonging the mixing action of the liquid on the vapor. These baffle plates are arranged in a stack or vertical series occupying about three fourths of the height of said chamber and leaving an open space above them, in which a flaring nozzle 12 is presented upward to direct a flow of liquid ammonia into the entire volume of downwardly flowing vapor at its first entrance into the said chamber. This nozzle is on the end of a pipe 13 through which liquid is driven by some means independent of the pressure of the ammonia. Such means may be a centrifugal pressure pump 14 driven by a motor 15, both conventionally indicated on Fig. 1 of the drawings. The ammonia is supplied to said pump through an inlet pipe 16 which is preferably connected with storage tank or liquid receiver 9 so as to draw therefrom, confining the operation within one continuous circulating refrigerating system or the like. Of course, however, the liquid might be supplied independently of said tank and the operation of the liquid forcing devices and the cooling chamber will be unaffected by such difference in supply.

The vaporizable and liquefiable material used is herein mentioned, by way of instance, as ammonia, because of its wide employment for refrigerating purposes. If any other vapor be used the liquid applied thereto in the preliminary cooling chamber should ordinarily be of the same kind, whencesoever derived, though in some instances and for some purposes one substance in liquid form may be applied to and mixed with the vapor of another substance acting as a cooling agent. But ordinarily in closed refrigerating systems and the like and in most other uses the fluid employed will be homogeneous throughout, merely changing from liquid to vaporous form and back again as needed.

The operation is as follows: The ammonia having been vaporized in acting as a refrigerant is liquefied again by the successive action of the compressor, mixing chamber and condenser, the work of the latter being greatly lessened, facilitated and perfected by the preliminary cooling preparation in said mixing chamber. The liquid for this preliminary cooling preparation is supplied by forcing the liquid ammonia up into the downflowing vapor of ammonia, as the latter enters said chamber, the cooling action of such liquid being prolonged by the subsequent retention of the liquid and vapor in intimate mixture as they pass down through said chamber, finally reaching the condenser as a partly vaporous mass, which is so largely liquid that the greater part of the condensing action has been effected in advance.

Having thus described my invention, what I claim as new and desire to secure by Letters Patent is:

1. In combination with a condenser for vapor, a preliminary cooling and mixing chamber having a series of annular baffles arranged in its interior surrounding a central space and occupying a part of the height of said chamber, a pipe supplying vapor to the space of said chamber above said baffles, a pipe supplying liquid to said space for mixing with such vapor, and a pipe conducting the mixed vapor and liquid from said chamber below said baffles to said condenser.

2. In combination with a condenser and a storage tank supplied with liquid thereby, a mixing and cooling chamber, through which vapor passes to said condenser, a pipe discharging liquid into said chamber to mix with said vapor, means independent of the pressure of such vapor for forcing liquid up through said pipe and a tubular connection from said tank supplying said forcing means and pipe.

3. In combination with a condenser and a storage tank supplied with liquid thereby, a mixing and cooling chamber through which vapor passes to said condenser, a pipe discharging liquid into said chamber to mix with said vapor, a flaring nozzle on the upper end of said pipe presented opposite the inflow of vapor, means independent of the pressure of such vapor for forcing liquid up through said pipe, and a tubular connection from said tank supplying said forcing means and pipe.

4. In combination with a condenser for vapor and a liquid receptacle supplied thereby, a preliminary mixing chamber through which the vapor passes to said condenser and means for transferring liquid from said receptacle to said chamber under pressure distinct from the pressure of said vapor.

5. A mixing chamber containing a series of baffle plates and having a passage through the midst of them, in combination with a terminal inlet and outlet for the passage of gas or vapor undergoing liquefaction and a liquid inlet and means other than the pressure of said vapor for forcing liquid through this latter inlet into said chamber substantially as set forth.

In testimony whereof, I have signed my name to this specification in the presence of two subscribing witnesses.

JOHN ERNST PHILLIPS.

Witnesses:
 H. H. ROUNTREE,
 H. W. HEAD.

Copies of this patent may be obtained for five cents each, by addressing the "Commissioner of Patents, Washington, D. C."